March 28, 1939.   H. BAEHR   2,152,454
WET PURIFICATION OF GASES, ESPECIALLY COAL DISTILLATION GASES
Filed Sept. 10, 1936
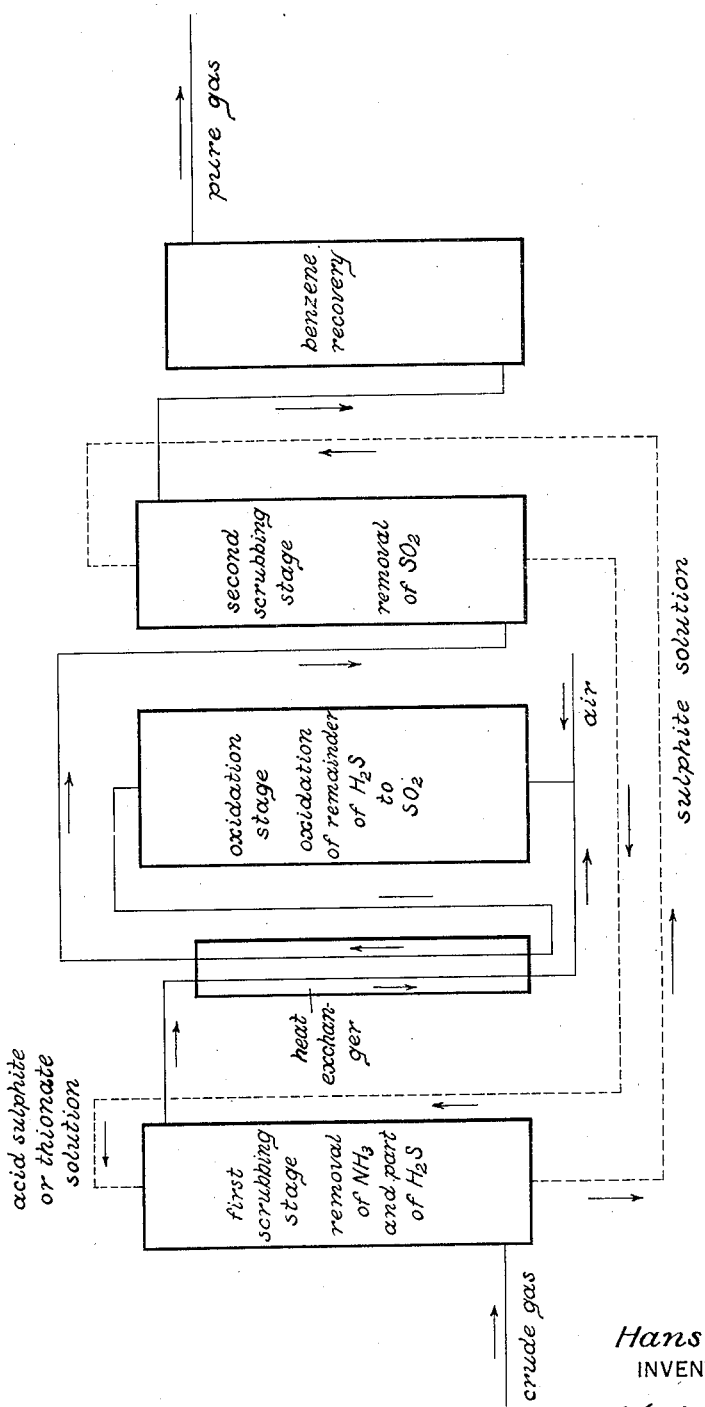
Hans Baehr
INVENTOR
BY *Hutz and Jolen*
HIS ATTORNEYS Patented Mar. 28, 1939

2,152,454

UNITED STATES PATENT OFFICE 2,152,454

WET PURIFICATION OF GASES, ESPECIALLY COAL DISTILLATION GASES

Hans Baehr, Leuna, Germany, assignor to I. G. Farbenindustrie Aktiengesellschaft, Frankfort-on-the-Main, Germany Application September 10, 1936, Serial No. 100,212
In Germany September 14, 1935

7 Claims. (Cl. 23—3)

The present invention relates to improvements in the wet purification of gases, especially of coal distillation gases, for the purposes of removing therefrom such constituents as ammonia, hydrogen sulphide, and also benzene and similar hydrocarbons.

It has already been proposed to free coal distillation gases, such as coke-oven and low temperature carbonization gases, from ammonia and hydrogen sulphide by first washing them with slightly acid thionate or sulphite solutions at ordinary temperature, converting the hydrogen sulphide remaining in the gas into sulphur dioxide by catalytic oxidation and then washing the same from the gas with the aid of the solutions obtained in the first stage. The procedure may also be that after the preliminary washing, by which the ammonia is removed from the gas, the gas is divided into two partial streams according to the ratio of ammonia to hydrogen sulphide of which one is subjected to catalytic oxidation while from the other the hydrogen sulphide may be removed as such, as for example with the aid of the solution arising from the treatment of the other partial stream. In the said methods, the separation of benzene and similar hydrocarbons from the gases has hitherto been carried out before the catalytic oxidation in order to avoid injury to the catalyst employed for the oxidation by any tarry constituents still contained in the gas.

I have now found that it is especially advantageous first to wash out from the crude gas, by means of acid thionate or sulphite-bisulphite solutions at ordinary temperature, the whole of the ammonia or the greater part thereof and that part of the hydrogen sulphide which, when oxidized to sulphur dioxide, would not be taken up by the circulating washing liquid, then to subject the whole gas to purification by converting the hydrogen sulphide to sulphur dioxide and washing out the latter by the solution led in circulation through the preliminary and main washing apparatus, and only then to carry out the separation of benzene and similar hydrocarbons. The general principle of this process is diagrammatically illustrated in the accompanying flow sheet, in which the gas lines are represented by full lines and the scrubbing liquid conduits by dotted lines; the direction of flow in each case being indicated by arrows.

The conversion of the hydrogen sulphide may be carried out for example by catalytic oxidation or by reaction with oxidizing agents, as for example by means of concentrated sulphuric acid with the simultaneous formation of sulphur and sulphur dioxide. This method has the special advantage that by the oxidation not only the hydrogen sulphide but also certain constituents of the gas which otherwise would be separated with the benzene and the like, are rendered non-injurious so that the resulting benzene is obtained in a purer form and gives rise to less waste in the refining with acids, in particular sulphuric acid, and alkalies. If the separation of the benzene hydrocarbons be effected in the usual manner with washing oils, there is also the advantage that the thickening of the washing oils which always takes place, occurs considerably more slowly so that a regeneration or renewal of the washing oil is not necessary for a long time. On the other hand, the benzene hydrocarbons may also be removed from the gas with the aid of adsorbents, as for example activated carbon.

In the treatment of the crude gases for the removal of ammonia, a certain portion of the hydrogen sulphide contained in the gas is also removed at the same time, the amount of the latter being greater, the more acid the sulphite or thionate solution used for the preliminary washing. The remainder of the hydrogen sulphide is converted by the oxidation, which is preferably a catalytic oxidation, into sulphur dioxide which serves for the production of bisulphite with sulphite solutions. The bisulphite thus formed in the main washing stage, according to its amount, then determines the amount of hydrogen sulphide which is washed out in the preliminary washing so that the composition of the absorption liquid is automatically regulated so that it completely absorbs both the ammonia and the hydrogen sulphide or the sulphur dioxide formed therefrom. The original ratio of ammonia and hydrogen sulphide present in the gas occurs again in the composition of the resulting washing liquid in the sense that with a large hydrogen sulphide content as compared with the ammonia content, the content of thiosulphate or polythionate in the solution increases, whereas with a ratio of ammonia to hydrogen sulphide in the crude gas of 2:1, the solution mainly contains ammonium sulphite, ammonium sulphate and small amounts of thiosulphate. When the conversion of hydrogen sulphide to sulphur dioxide by oxidation, for example, at the catalyst does not proceed completely, the residual hydrogen sulphide in the gas may also be absorbed by the acid washing liquid. When the ratio of ammonia to hydrogen sulphide is greater in favor of ammonia than corresponds to the two components in the salts of the final solution, the acid content of the washing liquid may be increased by the addition of acids from other sources, such as sulphuric acid, nitric acid, phosphoric acid, boric acids or salts of organic acids.

In case the crude gas contains a very large excess of hydrogen sulphide over the ammonia, it may be advisable to use the washing liquid issuing from the main washing stage and containing ammonium sulphite and ammonium bisulphite for removing hydrogen sulphide from another gas and only then to return it to the preliminary washing stage. On the other hand, in case there is a great excess of ammonia, a part thereof may be removed by means of an acid, as for example sulphuric acid, and the gas only then subjected to the treatment according to this invention.

The solutions arising from the washing of the gases may be worked up after acidification with sulphur dioxide in a simple manner into ammonium sulphate and sulphur by heating under pressure. During the acidification with sulphur dioxide, gases escape in some cases which still contain certain amounts of sulphur dioxide. These gases may be washed with the circulating liquid of the main or preliminary washing apparatus whereby waste of sulphur dioxide is avoided.

The following examples will further illustrate how this invention may be carried out in practice, but the invention is not restricted to these examples.

Example 1

7000 cubic metres of coke-oven gas containing from 10 to 12 grams of hydrogen sulphide, from 5.5 to 6.0 grams of ammonia and 1.0 gram of cyanogen per cubic meter are trickled per hour in a preliminary washing apparatus with a cooled acid solution containing thiosulphate, sulphite and bisulphite which is obtained from the main washing apparatus, whereby the ammonia is completely removed and from 1 to 2 grams per cubic meter of the hydrogen sulphide is removed. The gas is then heated in a heat exchanger to about 380° C. and, after the addition of 600 cubic meters of air per hour, is led over a catalyst consisting of nickel and activated carbon. The hydrogen sulphide is thus completely converted into sulphur dioxide with an increase of the temperature to 550° C.; after cooling the gas to 150° C. in a heat exchanger, the sulphur dioxide is washed out in a washer with a circulating solution containing ammonium sulphite. The solution absorbs the sulphur dioxide and becomes heated; it is then returned to the main washing apparatus through a cooler and the ammonia preliminary washing apparatus. The solution contains per liter about 200 grams of ammonium thiosulphate, 250 grams of ammonium sulphite-bisulphite and 100 grams of ammonium sulphate; the gas is entirely free from hydrogen sulphide, ammonia and cyanogen. A part of the solution is continuously withdrawn for boiling to give ammonium sulphate and sulphur which may be effected for example by heating under pressure after acidification with sulphur dioxide.

In the acidification of the solution intended for boiling with sulphur dioxide, which may be obtained for example by the combustion of sulphur, waste gases are formed which still contain small amounts of sulphur dioxide which are washed out with the circulating liquid of the main washing apparatus.

The purified coke-oven gas is then freed from benzene by washing it with about 7 cubic meters of washing oil per hour; after saturation, the washing oil is regenerated by expelling the benzene with steam.

Example 2

1000 cubic meters of coke-oven gas of the composition given in Example 1 are trickled in a preliminary washing apparatus for the removal of ammonia with a solution of sulphite, bisulphite and thiosulphate branched off from the main washing apparatus. The gas freed from ammonia is then heated to about 125° C. in a heat exchanger and led through about 70 per cent sulphuric acid, whereby the hydrogen sulphide is completely oxidized with the formation of sulphur which is separated in the liquid state in the sulphuric acid. By the oxidation of the hydrogen sulphide, the sulphuric acid is split up into sulphur dioxide and this is washed out from the gas in the main washing apparatus with the sulphite-thiosulphate solution coming from the preliminary washing apparatus, whereby bisulphite is re-formed. The sulphur is withdrawn and worked up into sulphuric acid which is used for reaction with the hydrogen sulphide. The saturated thiosulphate-sulphite solution is converted into the sulphur and ammonium sulphate with another part of the sulphuric acid under pressure at about 150° C.

The gas is then freed from benzene in the manner described in Example 1.

What I claim is:

1. The process of removing ammonia, hydrogen sulphide and a benzene hydrocarbon from a gas containing the same which comprises scrubbing said gas at ordinary temperature with an acid solution comprising a compound selected from the group consisting of ammonium thionate, ammonium sulphite and ammonium bisulphite, thereby removing ammonia and part of the hydrogen sulphide from the gas, then subjecting the whole of said gas to an oxidizing treatment converting the remaining hydrogen sulphide into sulphur dioxide, scrubbing the resulting gas with the solution issuing from the first scrubbing stage, returning the resulting solution to the first scrubbing stage, and thereafter treating the resulting gas for the removal of benzene hydrocarbons.

2. The process claimed in claim 1, in which the gas treated is a gas resulting from the carbonization of coal.

3. The process claimed in claim 1, in which the oxidizing treatment is a catalytic oxidation.

4. The process claimed in claim 1, in which the removal of benzene hydrocarbons is effected by washing the gas with a washing oil.

5. The process claimed in claim 1, in which the removal of benzene hydrocarbons is effected by passing the gas through an adsorbent.

6. The process claimed in claim 1, in which the gas treated is a gas resulting from the carbonization of coal, the oxidizing treatment is a catalytic oxidation, the removal of benzene hydrocarbons is effected by washing the gas with a washing oil.

7. The process claimed in claim 1, in which the gas treated is a gas resulting from the carbonization of coal, the oxidizing treatment is a catalytic oxidation, the removal of benzene hydrocarbons is effected by passing the gas through an adsorbent.

HANS BAEHR.